Aug. 7, 1945.                M. W. HUBER                    2,381,056
                                PUMP
                    Filed Oct. 19, 1942            2 Sheets-Sheet 1
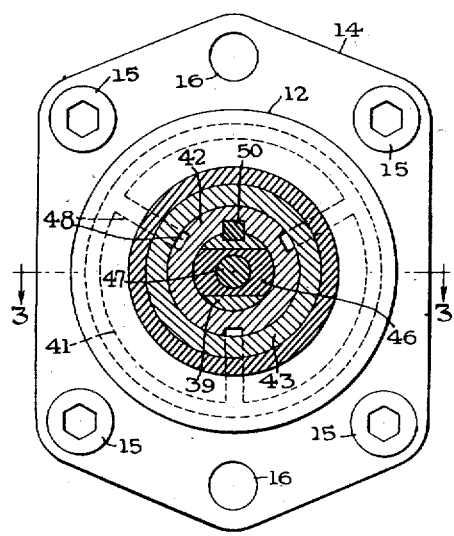
Fig.2
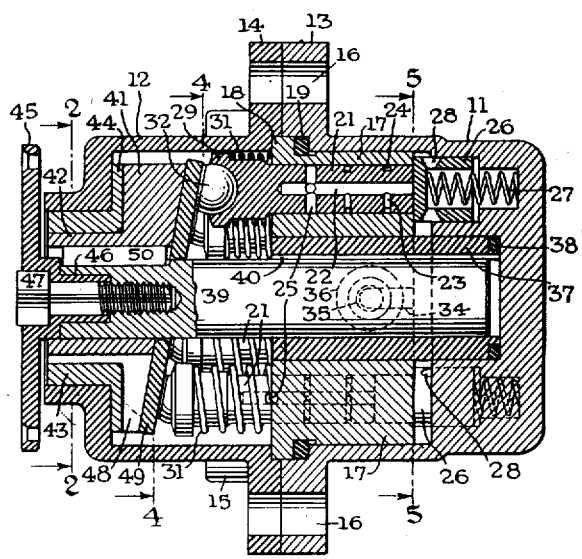
Fig.1
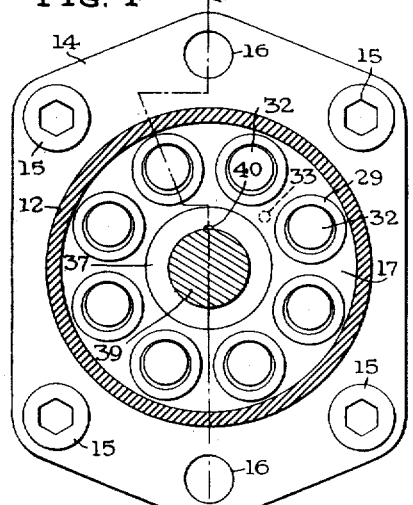
Fig.4
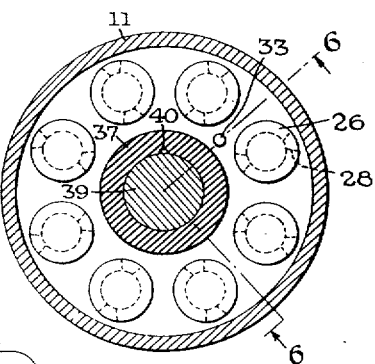
Fig.5
Fig.6
Fig.7
Inventor
Matthew W. Huber
Attorneys Aug. 7, 1945. M. W. HUBER 2,381,056
PUMP
Filed Oct. 19, 1942 2 Sheets-Sheet 2
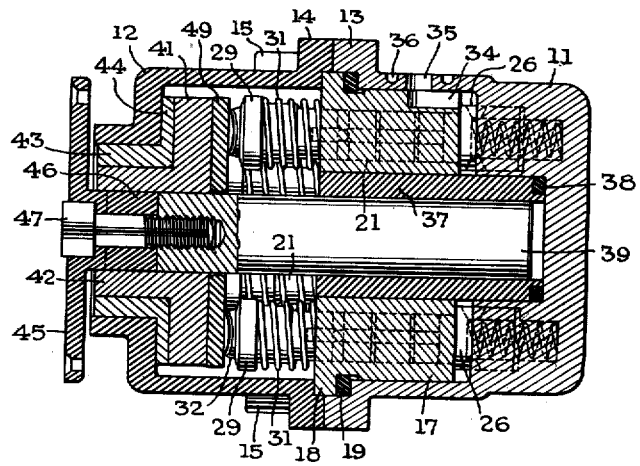
Fig. 3
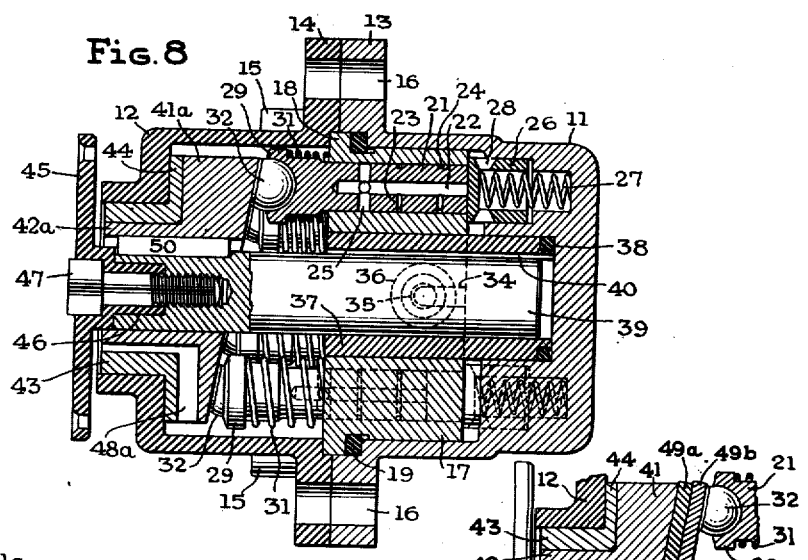
Fig. 8
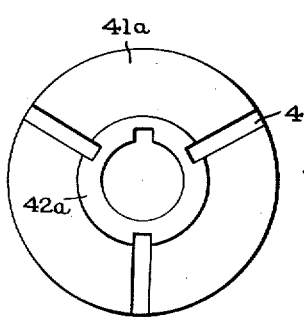
Fig. 9
Fig. 10
Inventor
Matthew W. Huber
Attorneys Patented Aug. 7, 1945

2,381,056

UNITED STATES PATENT OFFICE 2,381,056

PUMP

Matthew W. Huber, Chicago, Ill., assignor, by mesne assignments, to The New York Air Brake Company, a corporation of New Jersey Application October 19, 1942, Serial No. 462,563

13 Claims. (Cl. 103—5)

This invention relates to high pressure positive displacement pumps of the multiple-cylinder type in which the cylinders are arranged in a circular series around the drive shaft with their axes parallel with the axis of the drive shaft. The plungers are actuated in their displacing direction by a swash plate carried by the drive shaft, and are returned by individual coil compression springs.

The pump is primarily but not exclusively intended for use in conjunction with aircraft engines for various purposes, for example, to supply the regulator of a feathering airplane propeller with liquid under pressure for operating the feathering or pitch-controlling motors. For such uses, compactness, a simple form of housing, ability to operate at high and variable speeds, indifference to direction of rotation, and certainty of sustained operation are cardinal requirements.

The novelty resides in the simplicity and directness of design, the carefully planned provisions for maximum load carrying capacities of the vital parts, elimination of improperly controlled parts to ensure sustained life at high operating speeds, and the elimination of deforming strains in the cylinder block. The invention produces an assembly which can readily be dismounted. The parts are so designed that when the pump is dismounted every part is accessible for inspection and cleaning.

Preferred embodiments are illustrated in the accompanying drawings.

Fig. 1 is an approximately axial section of the complete pump, the planes of section being indicated by the line 1—1 on Fig. 4.

Fig. 2 is a section on the line 2—2 of Fig. 1.

Fig. 3 is a section on the line 3—3 of Fig. 2.

Figs. 4 and 5 are respectively sections on the line 4—4 and line 5—5 of Fig. 1.

Fig. 6 is a fragmentary section on the line 6—6 of Fig. 5.

Fig. 7 is a perspective view of the swash plate shown in Figs. 1 and 3.

Fig. 8 is a view, similar to Fig. 1 but showing a modified construction.

Fig. 9 is a view of the rear face of the swash plate used in the embodiment of Fig. 8.

Fig. 10 is a fragmentary view indicating the possibility of using more than one floating thrust plate.

Statements of direction in the following description assume that the pump is positioned as in Fig. 1.

Both forms of pump illustrated are intended to be entirely submerged in the hydraulic liquid, but this is not essential. In any event, one end of the housing, the left, as viewed in Figs. 1, 3 and 8, must be supplied with the hydraulic liquid to be pumped. The liquid flows through slots in the swash plate to reach the space within the left end of the housing with which the plunger inlet ports communicate. Discharge is through a lateral port in the housing which is located to the right of the mounting flange as indicated in Fig. 3.

In many cases the pump can be driven at moderate speed and the hydraulic liquid can be oil of good lubricating properties. Under such conditions the simplified construction of Fig. 8 is practicable. In most cases, however, the pump must be driven at quite high speeds, and must pump liquids having relatively poor lubricating qualities. To meet these conditions the preferred construction of Figs. 1 to 7, inclusive, has been devised.

The essential difference is that in the preferred construction at least one thrust plate is interposed between the swash plate and the thrust heads on the plungers. This offers two desirable possibilities: favorable selection of materials and, even more important, subdivision of the total rotary motion occurring between the swash plate and the plungers. Where one thrust plate is used, and one is ordinarily sufficient, as shown in the embodiment of Figs. 1 to 7, that plate assumes an intermediate rotary speed. A plurality of superposed plates give greater subdivision of motion and can be used as indicated in Fig. 10. This feature has demonstrated great practical utility.

The main shell or housing of the pump which may be of strong aluminum alloy is divided transversely into two components 11 and 12 having mating flanges 13 and 14, respectively. Flange 13 is thicker, and the machine screws 15 pass through the flange 14 and are threaded in the flange 13. The machine screws 15 are shown as of the socket head type, and four of them are used (see Figs. 2 and 4). Two holes indicated at 16 pass through both flanges, are unthreaded, and receive the fastening means which hold the flange of the pump against the mount (not shown).

The cylinder block 17 is cylindrical in form, and has an axial bore and a peripheral flange 18. Flange 18 seats in a circular rabbet deeper than the thickness of flange 18 and formed in the flanges 13 and 14. The cylinder block is sealed against leakage by a gasket 19. This gasket is shown as approximately filling the space in the rabbet to the right of the flange 18. The gasket 19 is initially of circular cross section.

The right end of the cylinder block is subject to pump discharge pressure and hence is urged strongly to the left. It is positively sustained by the seat formed in the portion 12 of the pump housing. It is also positioned by the bearing bushing for the drive shaft as will be explained.

Formed in the cylinder block 17 are a circular series of parallel cylinder bores, eight of which are shown. If desired for any reason, the bores may depart moderately from strict parallelism with the axis, and it is not essential that they be arranged in a single circular series. These cylinder bores receive the pump plungers 21. The plungers are axially bored as indicated at 22, and have radiating lubricating passages 23 which lead to peripheral grooves 24 cut in each plunger. This makes it possible to lubricate the plunger copiously by means of the hydraulic liquid as a lubricant. The grooves 24 are so spaced that their traces overlap as the plungers reciprocate.

There are also two cross bores 25 which are formed in the plunger and communicate with the axial bore 22. These cross bores 25 are the inlet ports and are exposed when the plunger reaches its maximum position to the left (see the lowermost plunger in Fig. 1). These bores also assist in lubrication.

There is an automatic discharge valve for each cylinder. These valves take the form of cups 26 and seat on the end of the cylinder block 17. There is one valve for each cylinder and each valve closes the entire open end of the corresponding cylinder bore (see the uppermost plunger in Fig. 1). The valve is guided in a recess bored within the end of the body portion 11, and each valve is urged in a closing direction by a coil compression spring 27. The space within each cup-shaped valve is vented by small breather ports 28 which are visible in Fig. 1.

Each plunger has an enlarged head 29 at its outer, or left hand, end. A coil compression spring 31, there being one such spring for each plunger, reacts between the head 29 and the left hand face of the cylinder block 17.

Each head 29 is accurately formed with a spherical socket whose depth exceeds its radius, so that the entrance to the socket is a circle smaller than a great circle on the sphere. Ball-like thrust heads 32, which make good bearing fits in the sockets, are forced into place, and when in place are retained because of smallness of the entrance opening. It is possible so to dimension the parts that the balls can be pressed in without injury and thereafter are strongly retained.

Each thrust ball has a flat thrust face formed on a protruding boss whose diameter is less than the diameter of the entrance opening of the socket; sufficiently less to permit necessary tilting motion of the ball while preventing excessive tilting. Each thrust face is secant to its ball.

The cylinder block 17 does not rotate, and to fix its position, a stake 33 is used. This engages cylinder block 17 and the head portion of housing 11 (see particularly Fig. 6). With the cylinder block 17 properly positioned by the stake 33, the discharge passage 34, which is a slot in the periphery of the cylinder block 17, is held in proper register with the discharge port 35 in body portion 11 (see Fig. 3).

The discharge port 35 is surrounded by a groove 36 which receives a gasket (not shown) and forms an oil tight seal with the pump mount (not shown) around the high pressure oil passage therein. Since no novelty is here claimed for the mount and the mode of connecting the discharge passage, the details are omitted from the drawings.

A bearing bushing 37 is pressed into the axial bore in the cylinder block 17 so as to be fixed therein. This bushing makes a close fit with an alined bore in the inner face of the head of body 11. The bushing is formed with an encircling end recess to receive a sealing ring 38 which is of circular cross section before it is subjected to pressure.

An oil groove 40 extends the entire length of bushing 37 and supplies lubrication at pump inlet pressure to the drive shaft 39 which turns in the bushing. The sealing ring 38 protects the end of the shaft from pump discharge pressure. Like gasket 19 it may be formed of an oil resisting rubber substitute.

It should be observed that although the internal parts of the pump are freely removable when the two parts of the housing are separated, only two gaskets are need to give the required seals against leakage, and all parts are positively positioned.

The drive shaft 39 carries the swash plate 41 which has a hub 42. This hub 42 turns in a bearing bushing 43 mounted in an aperture in the left end of the body portion 12. The bushing 43 has a flange 44 which seats against the end of the portion 12 and acts as a thrust bearing for the swash plate 41. The shaft 39 is keyed to the hub 42 at 50. The driving disk 45, which is driven by any suitable rotating means (not shown in the drawings), has a projecting flattened hub 46 which extends into a cross slot formed in the outer end of the shaft 39. The driving disk 45 is held in place, with its hub confined in the cross slot, by means of an axially extending machine screw 47.

In order to admit oil to the space within the housing portion 12 to the left of the plungers 21, the swash plate is provided with radial through slots 48 which also extend along the hub 42. The construction is most clearly shown in Fig. 7, and as indicated in this figure there are three such radial slots 48. These slots provide lubrication for hub bearing and thrust bearing, serve as inlet ports for the pumped oil, and also afford an impeller action which in pumps driven at high speed gives what might be called a supercharging effect.

An annular floating thrust plate 49 is interposed between the inclined face of the swash plate and the thrust heads 32 already described. Bearing bushings 43 and 37 may be of any suitable bearing material. The swash plate 41 and the thrust heads may be of any suitable material. The floating annular thrust plate 49 is of heat treated steel as are the plungers 21 and the cylinder block 17.

As indicated in Fig. 10, a plurality of superposed thrust plates 49a, 49b may be substituted for a single thrust plate 49.

The modified structure shown in Fig. 8 is identical with that shown in Figs. 1–7 except that the floating thrust plate 49 is omitted. Parts in Fig. 8 which are identical with those in Figs. 1 to 7 are given the same reference numerals. Omission of the floating thrust plate 49 requires that the swash plate 41a, shown in Fig. 8, be thickened correspondingly, as is clearly indicated.

In order to provide a continuous bearing surface for the thrust heads 32 in Fig. 8, the radial slots 48a (see particularly Fig. 9) are cut only in the rear or outer face of the swash plate 41a and do not extend clear through to its right or working face.

Thus only the swash plate need be changed in form if it is desired to omit the floating thrust plate 49.

With the swash plate and the thrust heads arranged according to the preferred construction of Figs. 1 to 7, and 10, part of the rotary motion is between the heads 32 and a floating thrust plate, and part is between a thrust plate and the swash plate. When more than one thrust plate is used, there will be some relative motion between the thrust plates. In the embodiment of Fig. 8, the entire motion is between the heads and the swash plate.

The basic operating characteristics of the two pumps are the same. The rotation of the shaft 39 entails rotation of the swash plate 41, or 41a as the case may be, with attendant reciprocation of the pump plungers. The springs 31 are sufficiently heavy to compel the plungers to follow the swash plate, but if one should stick the thrust ball will not escape or even become seriously misalined. The inlet ports open only near the full outward position of the plunger, but the working spaces fill almost instantly as is demonstrated by the volumetric efficiencies of pumps actually built and submitted to quantitative tests. The impeller effect of the slots 48 assists in this.

Good volumetric efficiencies are had at speeds of 4375 R. P. M. against head pressures of 1500 pounds per square inch. The demonstration pump had a total piston displacement of 0.09 cubic inch per revolution.

In the innermost position of the plungers 21, they closely approach valves 26. It is known practice to cause plungers of this general type to strike and positively unseat the related valve. This known expedient can be adopted, if desired, but is not considered to be advantageous.

From the practical standpoint of operation and maintenance, much of the success of the pump is attributable to the simplicity and directness of its design. When the two parts 11 and 12 of the housing are separated, the cylinder block and the main bearing bushing are freely withdrawable. So are the swash plate, the floating thrust plate, the plungers and the valves.

The connection of the drive disk 45 with the main drive shaft 39 is effected by a simple cross slot connection, and because the hub of the disk is centered by the hub of the swash plate, a single connecting screw is all that is required. This screw and the screws which hold the two halves of the housing together are the only releasable connections used.

The two halves of the housing are in metal-to-metal contact and the cylinder block and the main bearing bushing which forms a unit therewith are positively positioned within this housing by the flange 18 and by the inner end of bushing 37. This makes it possible to secure on a production basis the necessary precise alinement of bushing 37 with bushing 43. The necessary seals for the removable components are produced very simply by two compressible gaskets which are completely confined and do not in any way impair alinement of the sealed components.

Throughout the pump there is not a single inaccessible port or passage. When the pump is dismounted, every part and the entire surface of every part is accessible for inspection and cleaning. The importance of this feature cannot be overstated. In manufacturing precision pumps, grinding and lapping methods are necessarily used. If the components are difficult to clean, and particularly if any passage is inaccessible, small quantities of abrasive are likely to be left. When these particles are released they cause destruction of the pump after a very short life. The same considerations apply to abrasive grit which may enter the pump during its normal operation.

The use of one or more floating thrust plates 49, sometimes called creep plates, improves the operation of the pump. Their creeping action distributes the motion and the wear, and favorably affects the overall performance of the pump. All working parts are adequately lubricated. In fact, most of them run in the oil being pumped.

The method of mounting the thrust balls in the plungers and the special configuration of these thrust balls ensure large bearing areas and guard against the escape of any thrust ball or the misalinement thereof in the event that its plunger should stick slightly on the suction stroke.

The contingencies just named are unlikely to occur but their occasional occurrence must be contemplated as possible. The provision of means to minimize their harmful effect is a matter of substantial importance.

The pump operates smoothly because it is very nearly in dynamic balance. It has demonstrated the ability to run for long periods without servicing or inspection even when operating at very high delivery pressures and at high and varying speeds.

Several embodiments or modifications have been described. While preferred embodiments have been discussed in considerable detail, it is recognized that changes within the scope of the invention are possible, and these described embodiments are intended to be illustrative only.

What is claimed is:

1. The combination of a rotary swash plate; thrust and radial bearings supporting the swash plate; means forming a plurality of pump cylinders substantially parallel with the axis of rotation of the swash plate and arranged in circular series around said axis; plungers in said cylinders, each plunger having a thrust head adapted to be actuated by the swash plate; and a housing enclosing said swash plate and plunger heads, there being supply passages which lead from the point of supply to the interior of the housing and communicate with the contact area between said swash plate and said thrust and radial bearings, and intake ports leading from the interior of the housing to said pump cylinders.

2. The combination of a rotary swash plate; thrust and radial bearings supporting said swash plate; means forming a plurality of cylinders substantially parallel with the axis of rotation of the swash plate and arranged in circular series around said axis; plungers in said cylinders, each plunger having a thrust head; and a floating thrust plate interposed between and in sliding contact with the thrust heads of the plungers and the swash plate.

3. The combination of a rotary swash plate; thrust and radial bearings supporting said swash plates; means forming a plurality of cylinders substantially parallel with the axis of rotation of the swash plate and arranged in circular series arount said axis; plungers in said cylinders, each plunger having a thrust head; and a plurality of superposed thrust plates interposed between the thrust heads of the plungers and the swash plate, one of said plates operating in sliding contact with the swash plate and another operating in sliding contact with the heads of the plungers.

4. The combination of a rotary swash plate; thrust and radial bearings supporting said swash plate; means forming a plurality of pump cylinders substantially parallel with the axis of rotation of the swash plate and arranged in circular series around said axis; plungers in said cylinders, each plunger having a universally tiltable thrust head with flat bearing surface; a floating thrust plate interposed between and in sliding contact with the thrust-head bearing surfaces and the swash plate; and a housing enclosing said swash plate, floating plate and thrust heads, there being passages leading from a point external to the housing to the interior thereof along the contact areas between the swash plate and said thrust and radial bearings and between the swash plate and said floating plate and from the interior of the housing to said pump cylinders.

5. The combination of a rotary shaft; a swash plate turning therewith; means forming a plurality of pump cylinders substantially parallel with the axis of said shaft and arranged in a circular series around said axis; plungers in said cylinders, each plunger having a spherical recess in its head, the depth of said recess being greater than the radius of the recess and the entrance aperture to the recess being smaller than a great circle; thrust balls, one captive in each of said recesses, each ball having a flat thrust surface which is secant to the ball and external to the recess; and means urging said plungers toward the swash plate.

6. The combination of a pump cylinder; a pump plunger; a rotary plunger actuator; and a universally tiltable thrust means between the actuator and the plunger, comprising a ball mounted in a closely fitting socket in the plunger, the ball having a flat thrust surface which is secant to the ball but external to the socket, the socket being of unitary construction greater in depth than the radius of the ball and having an entrance aperture smaller than a great circle measured on the ball whereby the ball must be pressed in place in the socket and is thereafter retained.

7. The combination of a pump cylinder, a pump plunger; a rotary plunger actuator; and universally tiltable thrust means between the actuator and plunger, comprising a ball mounted in a closely fitting socket in the plunger, and having a flat thrust surface which is secant to the ball, but external to the socket and formed on a boss projecting from the ball.

8. The combination defined in claim 7 in which the socket has a depth greater than the radius of the ball, and the ball is larger than the entrance to the socket and hence is retained in the socket.

9. The combination of a rotary shaft; a swash plate turning therewith; means forming a plurality of pump cylinders substantially parallel with the axis of said shaft and arranged in a circular series around said axis; plungers in said cylinders; each plunger having a spherical recess in its head; thrust balls, one seated in each of said recesses, each ball having a flat secant thrust face external to the recess; a floating thrust plate interposed between said thrust faces and the swash plate; and means urging said plungers toward the swash plate.

10. The combination of a rotary shaft; a swash plate turning therewith; means forming a plurality of pump cylinders substantially parallel with the axis of said shaft and arranged in a circular series around said axis; plungers in said cylinders, each plunger having a spherical recess in its head; thrust balls, one seated in each of said recesses, each ball having a flat secant thrust face external to the recess; and at least two superposed floating thrust plates interposed between said thrust faces and the swash plate; and means urging said plungers toward the swash plate.

11. In a pump, the combination of a plurality of cylinders; plungers for said cylinders, each plunger serving to open an inlet passage to its cylinder in its retracted position; a rotary cam for reciprocating all said plungers so that their inlet passages are opened successively; a rotary impeller associated with said cam and having a supply connection for liquid to be pumped, and a housing enclosing said cam and forming a flow connection from said impeller to said inlet passages.

12. In a high speed plunger pump, the combination of a cylinder; a plunger protruding therefrom and having an inlet port exposed at the side of the plunger when the latter is retracted and extending longitudinally through the plunger to the interior of the cylinder, the plunger having encircling lubricating grooves in communication with said inlet port; and means for reciprocating the plunger.

13. In a pump, the combination of a cylinder block formed with substantially parallel cylinders arranged around a central bearing, said cylinder block having a single peripheral locating element; a housing for the pump, comprising two parts separable on a plane and in metal-to-metal contact with each other, said parts having, adjacent said plane, a seat to receive and position the locating element on the cylinder block and also fix the relative position of the two housing parts; a combined thrust and radial bearing unit mounted on and positioned by the second housing part so as to be alined with said central bearing; means for connecting the portions of said housing; a rotary unit comprising a shaft and swash plate mounted in said central bearing and bearing unit; and plungers working in the cylinders and actuated by the swash plate.

14. In a pump, the combination of a cylinder block formed with substantially parallel cylinders arranged around a central bearing, said cylinder block having a single peripheral locating element; a housing for the pump, comprising two parts separable on a plane and in metal-to-metal contact with each other, said parts having, adjacent said plane, a seat to receive and position the locating element on the cylinder block and also fix the relative position of the two housing parts; a combined thrust and radial bearing unit mounted on and positioned by the second housing part so as to be alined with said central bearing; means for connecting the portions of said housing; a rotary unit comprising a shaft and swash plate mounted in said central bearing and bearing unit; plungers working in the cylinders and actuated by the swash plate; a gasket sealing the periphery of the cylinder block to the first portion of the housing; and a second gasket sealing the cylinder block to the same portion of the housing around said central bearing.

15. In a pump, the combination of a cylinder block formed with substantially parallel cylinders arranged around a central bearing, said cylinder block having a single peripheral locating element; a housing for the pump, comprising two parts separable on a plane and in metal-to-metal contact with each other, said parts having, adjacent said plane, a seat to receive and position the locating element on the cylinder block and also fix the relative position of the two housing parts; a combined thrust and radial bearing unit mounted on and positioned by the second housing part so as to be alined with said central bearing; means for connecting the portions of said housing; a rotary unit comprising a shaft and swash plate mounted in said central bearing and bearing unit; plungers working in the cylinders and actuated by the swash plate; a gasket sealing the periphery of the cylinder block to the first portion of the housing; a second gasket sealing the cylinder block to the same portion of the housing around said central bearing; and discharge valves for the cylinders between the cylinder block and housing in the interval between said gaskets.

16. In a pump, the combination of a generally cylindrical housing, transversely divided and having external mating flanges with releasable connectors and an internal rabbet adjacent the plane of junction; a cylinder block mounted in one part of the divided housing and fixed against rotation therein, said cylinder block having a flange received in said rabbet, an axial bore, and a plurality of cylinder bores substantially parallel with said axial bore; a bearing bushing fitting said axial bore and having centering engagement with the same portion of the housing which receives the cylinder block; a combined radial and thrust bearing bushing in the other portion of the housing; a swash plate axially sustained by the thrust portion of the last named bushing and having a hub turning in the radial bearing portion thereof, there being combined inlet and lubricating passages which are bounded in part by the bearing areas of the swash plate and hub; a drive shaft turning in the first named bushing and connected rigidly with the swash plate; and a plurality of spring urged pump plungers working in said cylinder bores in coactive relation with said swash plate.

17. The combination defined in claim 16 in which there is a discharge chamber between the cylinder block and the end of the housing part in which the cylinder block is moutned and in which spring urged poppet valves, one for each cylinder bore, seat against the block and serve as discharge valves for respective cylinders.

18. The combination defined in claim 16 in which the first named bearing bushing is fixed in the cylinder block forming a unit which is freely withdrawable from the housing upon separation of the parts of the housing; and compressible ring gaskets, one sealing the block and the other sealing the end of the bushing, each to the housing, and serving to isolate a discharge chamber located in the housing at the inner end of the block, from the chamber in which the swash plate is mounted, and from the end of the drive shaft.

MATTHEW W. HUBER.